United States Patent [19]
Cutler, Jr. et al.

[11] Patent Number: 5,862,479
[45] Date of Patent: Jan. 19, 1999

[54] SPACE-BASED COMMUNICATION SYSTEM AND METHOD WITH CONTINUOUS CHANNEL REUSE MAINTENANCE

[75] Inventors: Victor Hawes Cutler, Jr., Chandler; Keith Andrew Olds, Mesa, both of Ariz.; Gerald Joseph Davieau, Eldersburg, Md.

[73] Assignee: Motorola, Inc., Schaumburg, Ill.

[21] Appl. No.: 775,073

[22] Filed: Dec. 27, 1996

[51] Int. Cl.⁶ .................................................. H04B 7/185
[52] U.S. Cl. .......................... 455/428; 455/62; 455/63; 455/67.3
[58] Field of Search ..................... 455/446, 447, 455/448, 450, 451, 452, 427, 428, 429, 430, 62, 63, 67.1, 67.3, 12.1, 13.1, 507, 509

[56] References Cited

U.S. PATENT DOCUMENTS 4,736,453  4/1988  Schloemer .............................. 455/450
5,669,062  9/1997  Odd et al. ................................ 455/62

*Primary Examiner*—Thanh Cong Le
*Attorney, Agent, or Firm*—Harold C. McGurk

[57] ABSTRACT

The system (10) and method (100) adjust reuse units when nodes (e.g., satellites (20, 22)) move in a communication system (10), such as satellites (20,22) moving in their orbits around the earth in a space-based communication system (10). The method (100) and system (10) computes interference potentials between a reference reuse unit in a first reuse unit table of a first satellite (20) and reuse units being used in second reuse unit tables in second satellites (20) that are adjacent to the first satellite (20); and when the interference potentials is less than a predetermined threshold, then assigns the satellite a non-interfering reuse unit for the specific time interval.

29 Claims, 2 Drawing Sheets

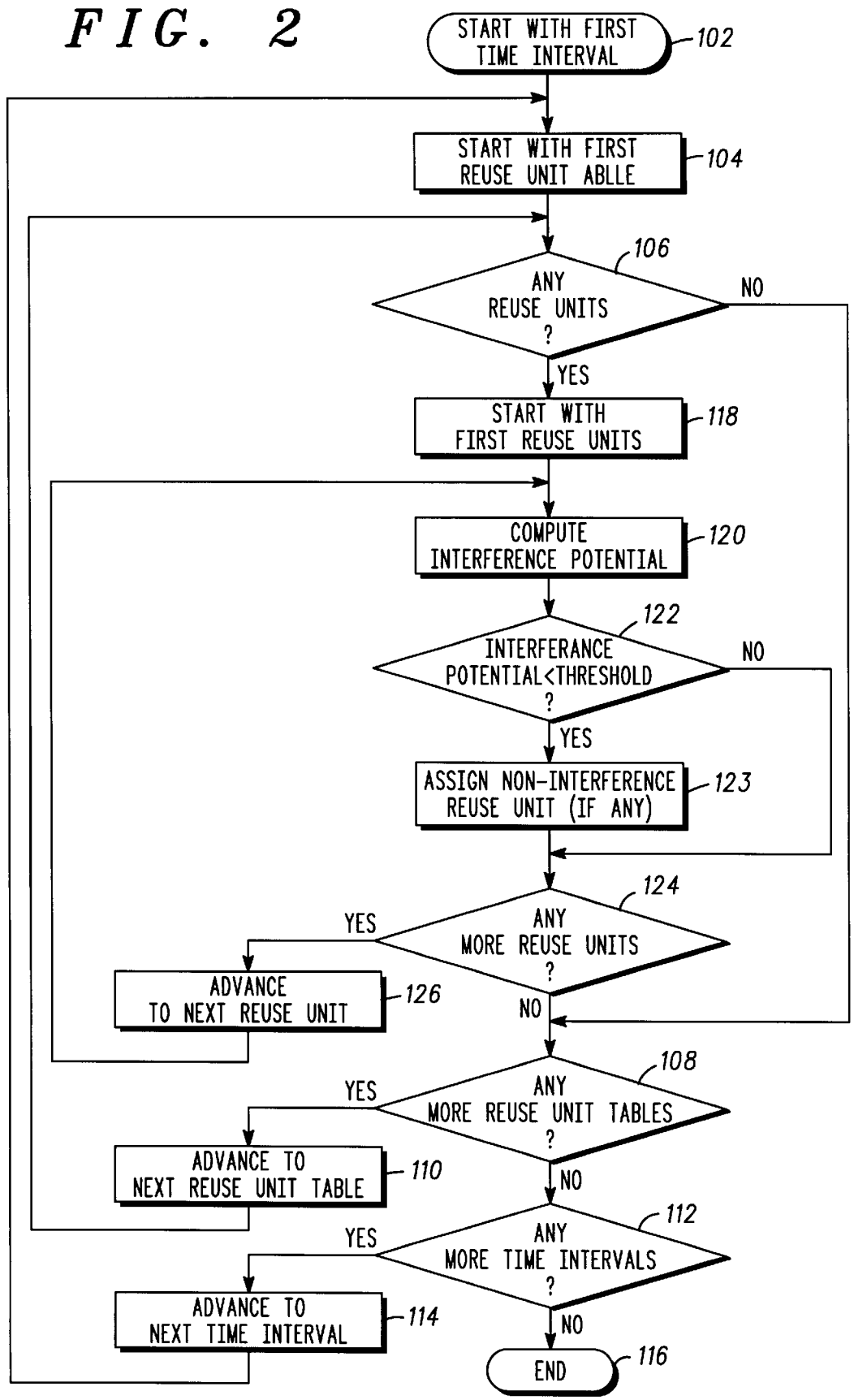

5,862,479

SPACE-BASED COMMUNICATION SYSTEM AND METHOD WITH CONTINUOUS CHANNEL REUSE MAINTENANCE

TECHNICAL FIELD

This invention relates generally to communication systems and, in particular, to a system and method for managing and reusing channels in a space-based communication system.

BACKGROUND OF THE INVENTION

In terrestrial-based cellular systems, channel assignments are made within fixed frequency reuse cell clusters. A cluster comprises a set of predetermined cells which are adjacent to each other. That is, each cell within a predetermined cluster is given a unique set of orthogonal channels so that channels within a cluster do not interfere with one another. Outside of the cluster, the channels are reused. The reuse between clusters may follow a fixed pattern designed to minimize interference between the clusters.

The reuse cluster technique associated with terrestrial-based cellular systems is difficult to implement when the cellular base stations are replaced by satellites in a low-earth orbit (LEO). Time division multiplex access (TDMA) and frequency division multiple access (FDMA) communication systems and systems that use similar channel structures avoid excessive interference by assigning traffic channels that do not conflict with other traffic channels in time or frequency. The channel assignment problem is exacerbated when one end of the communication system is located at the LEO satellites where differential Doppler shifts, differential propagation times and relative motion between the satellites can cause transmissions between a user and a satellite to interfere with channels in use on another satellite. This problem becomes even more severe when earth terminals or stations can transmit and receive over large coverage angles that may include several satellites.

Accordingly, there is a significant need for a system and corresponding method that efficiently manage time, code and/or frequency resources without interfering with other channels.

BRIEF DESCRIPTION OF THE DRAWINGS

FIG. 2 shows a reuse maintenance method in accordance with a preferred embodiment of the present invention.

DESCRIPTION OF THE PREFERRED EMBODIMENTS

Figure 1:
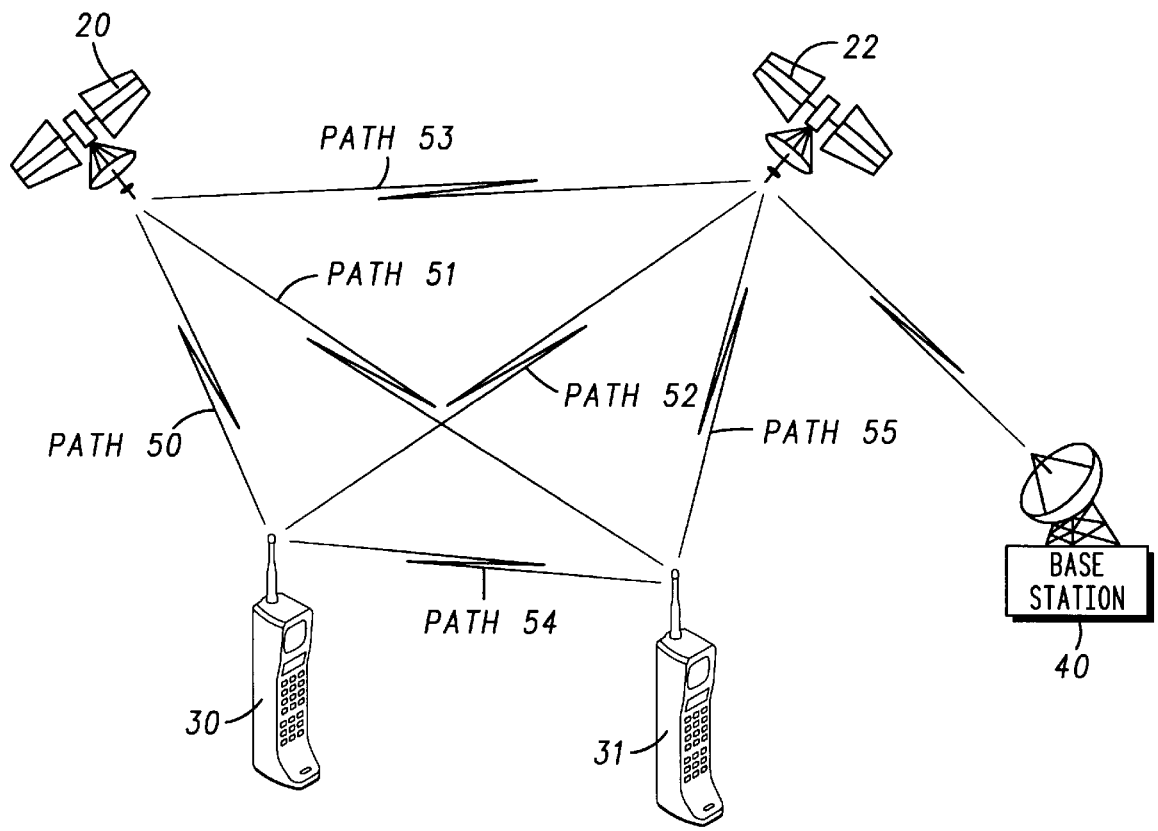
FIG. 1 depicts a highly simplified diagram of a satellite-based communication system and a satellite interference scenario of which the present invention may form a portion thereof.

Movement of nodes (e.g., satellites) in a communication system, such as a satellite communication system, results in the need to adjust the frequencies of operation, time slot and/or code division as the nodes move relative to one another to efficiently use the system spectral resources. Such adjustment can be characterized as a maintenance function which is essential to keep physical separation of common communication parameters (such as frequency). The repetition of the same communication parameter is commonly referred to as reuse and therefore, the present invention provides reuse maintenance for a communication system which depends upon reuse for efficient use of time, code and/or frequency resources.

Interdependencies between elements in a space-based system (e.g., the satellites and their relative positions) make it possible to identify chained linkages that will permit reuse maintenance adjustments to occur through the sequential change of elements in a sequence of beams. This is important when tight constraints exist because many reuse units are in use and only through sequential changes is it possible to achieve a desired change while maintaining throughput or capacity.

FIG. 1 depicts a highly simplified diagram of a satellite-based communication system and a satellite interference scenario of which the present invention may form a portion thereof. As shown in FIG. 1, space-based communication system 10 comprises at least one of each of satellites 20, 22, any number of subscriber units 30, 31 and at least one base station 40. Generally, satellites 20, 22, subscriber units 30, 31 and base station 40 of space-based communication system 10 may be viewed as a network of nodes. All nodes of communication system 10 are or may be in data communication with other nodes of communication system 10 through communication links. In addition, all nodes of communication system 10 are or may be in data communication with other telephonic devices dispersed throughout the world through public switched telephone networks (PSTNs) and/or conventional terrestrial communication devices coupled to a PSTN through conventional terrestrial base stations.

A "satellite" as used throughout this description means a man-made object or vehicle intended to orbit the earth. A "constellation" means a number of satellites arranged in orbits for providing specified coverage (e.g., radio communication) of a portion, portions or all of the earth. A constellation typically includes multiple rings (or planes) of satellites and may have an equal number of satellites in each plane, although this is not essential.

The present invention is applicable to space-based communication systems 10 that assign particular regions on the earth to specific cells on the earth, and preferably to systems 10 that move cells across the surface of the earth. Satellites 20, 22 may be one of many satellites in a constellation of satellites orbiting earth. The present invention is also applicable to space-based communication systems 10 having satellites 20, 22 which orbit earth at any angle of inclination including polar, equatorial, inclined or other orbital patterns. The present invention is applicable to systems 10 where full coverage of the earth is not achieved (i.e., where there are "holes" in the communication coverage provided by the constellation) and to systems 10 where plural coverage of portions of the earth occur (i.e., more than one satellite is in view of a particular point on the earth's surface).

In the preferred embodiment, satellites 20, 22 are in a low-earth orbit around earth. In an alternative embodiment, satellites 20, 22 may be in medium-earth orbit. Low-earth orbit satellite are typically at an altitude range of 700 km to 1400 km (400 to 800 miles) altitude, while medium-earth orbit satellite at an altitude of about 10,000 km (6200 miles), and geosynchronous satellites are at an altitude of about 36000 km (23,000 miles).

Satellites 20 and 22 communicate with each other via cross-links. Satellites 20 and 22 are adjacent satellites that are in view of each other. These cross-links form a backbone of space-based communication system 10. Thus, a call or user communication, including but not limited to voice, fax and data from subscriber units 30, 31 (which are located at any point on or near the surface of the earth) may be routed through satellite 20, 22 or other satellites in the constellation to within range of substantially any other point on the surface of the earth. A communication may be routed down to subscriber unit 31 (which is receiving the call) on or near the surface of the earth from satellite 22. How satellites 20, 22 physically communicate (e.g., spread spectrum technology) with subscriber units 30, 31 and base station 40 is well known to those of ordinary skill in the art.

Satellite 20 communicates user information (e.g., voice, fax and data) and satellite control information with satellite 22 via a cross-link when satellite 20 is in view of satellite 22. Satellite 20 is not always in view of satellite 22, but is in view of satellite 22 for a period of time during its orbit around the earth. In alternative embodiments, there are multiple satellites 22, where each satellite 20 is able to communicate with one of the satellites 22 no matter where they are in their orbit around earth. Moreover, each satellite 22 may be able to communicate with other adjacent satellites 22. Satellites 20, 22 receive satellite control information from base station 40 and communicates it to the appropriate satellites.

Subscriber units 30, 31 may be located anywhere on the surface of earth or in the atmosphere above earth. Space-based communication system 10 may accommodate any number of subscriber units 30, 31. Subscriber units 30, 31 are preferably communication devices capable of receiving voice and/or data from satellites 20 and/or base stations 40. By way of example, subscriber units 30, 31 may be hand-held, mobile satellite cellular telephones adapted to transmit to and receive transmissions from satellites 20, 22 and/or base stations 40. Moreover, subscriber units 30, 31 may be computers capable of sending email messages, video signals or facsimile signals just to name a few.

How subscriber units 30, 31 physically transmit voice and/or data to and receive voice and/or data from satellites 20, 22 is well known to those of ordinary skill in the art. In the preferred embodiment of the present invention, subscriber unit 30 communicates with satellite 20 using a limited portion of the electromagnetic spectrum that is divided into numerous channels. The channels are preferably L-Band, K-Band, S-band frequency channels or combinations thereof, but may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art.

Base station 40 communicates with and controls satellites 20, 22. There may be multiple base stations 40 located at different regions on the earth. For example, there may be one base station located in Honolulu, another base station located in Los Angeles and another base station in Washington, D.C. Base stations 40 may provide satellite signalling commands to satellites 20, 22 so that satellites 20, 22 maintain their proper position in their orbit and perform other essential housekeeping tasks. Base stations 40 may be additionally responsible for receiving voice and/or data from satellites 20, 22. How base station 40 physically communicates (e.g., spread spectrum) with satellites 22, 20 and/or subscriber units 30, 31 is well known to those of ordinary skill in the art.

Each satellite 20, 22, subscriber units 30, 31 and base station 40 comprises memory and a number of processors for storing and executing, respectively, the method described herein and communication unit(s) for sending to and receiving data and/or information from each other. Memory, processors and communication units are well known and commercially available from a variety of vendors.

FIG. 1 also illustrates potential interference paths that can occur in a space-based communication system. Paths 50 and 55 are the desired signal paths between subscriber units 30 and 31 and satellites 20 and 22, respectively. In this example, subscriber unit 30 and satellite 20 are synchronized so that transmissions from subscriber unit 30 arrive at satellite 20 during the correct receiver window for the assigned channel. Satellite 22 is at a different distance from subscriber unit 30 than satellite 20 and is moving at a different velocity relative to subscriber unit 20 than satellite 20.

There is generally a different propagation delay and Doppler frequency shift between satellite 22 and subscriber unit 30 than there is between satellite 20 and subscriber unit 30. Any interference that reaches satellite 22 from subscriber unit 30 may not be in the time slot and frequency access that corresponds to the user channel of subscriber unit 30. The interference may have "slid" into a different channel. If this second channel has been assigned to subscriber unit 31, unacceptable interference may result. Thus, even if channels are only used once, channels from one station may interfere with channels from a different station in a dynamic system. Further, the potential for interference of this type depends on the locations and motions of satellites 20 and 22 relative to the location of subscriber unit 30. If satellites 20 and 22 are in any orbits except the special case of the geostationary orbit, these relative positions and motions change over time. Therefore, the interference potential between two channels in the system also change with time and channels that were non-interfering when they were originally assigned, may become interfering at a later time.

FIG. 2 shows a reuse maintenance method in accordance with a preferred embodiment of the present invention. Method 100 plans reuse maintenance so there is no interference between reuse units. A reuse unit is the fundamental unit of the combined frequency, time and/or code resources that define communications channels which can be reallocated between satellites or cells. Reuse maintenance method 100 is preferably executed by a computer at base station 40; however, in an alternative embodiment, reuse maintenance method 100 may be performed on the satellites of a constellation. Method 100 is initiated during a planning process, when a satellite goes down or malfunctions, or when an antenna on-board a satellite goes down or malfunctions. The planning process, for example, may be performed daily for the next day's activities or after a predetermined period of time, such as every twenty-four hours.

Associated with each satellite is a reuse unit table or similar data structure. For example, if there were fifteen satellites in the space-based communication system, there would be fifteen reuse unit tables. In the preferred embodiment, each reuse unit table has a number of time slot columns by a number of frequency slot rows. It is unimportant to the present invention how many time slots or frequency entries there are, or whether the time slots and frequencies are represented in rows and columns rather than columns and rows. Moreover, instead of using time slots and frequencies, other combinations of time slots, frequencies and codes may be used.

In the reuse unit table, each time slot/frequency entry is referred to a reuse unit. Reuse units are assigned (during the first or subsequent planning sessions) by the base station or satellites of the constellation to accommodate expected high traffic in select regions on the earth. In the preferred embodiment, a reuse unit includes eight contiguous communication channels but those skilled in the art will understand that other reuse unit definitions could be used as well.

On each satellite, there are a number of beams pointing to earth to accommodate calls being made by subscribers. The number of beams is unimportant to the present invention and could be a small amount or a large number of beams. At each point of the satellite in its orbit about earth, the location of each of the beams is preplanned and known. The location of the beam does not change for that particular point of the satellite in its orbit. Each reuse unit selected by the base station is assigned to a particular beam on the satellite during a period of time. The location of the beam (and thus the center of the beam) is determinable and known by the base station.

As shown in FIG. 2, method 100 begins in step 102 by starting with the first time interval (or time =0) and in step 104 with the first reuse unit table. Method 100 determines in step 106 if any reuse units are being used in the table. This determination could be made by looking for any assignment of a reuse unit to a particular beam for the first time interval. If there are no reuse units that are being used during the first time interval, method 100 advances to step 108 to determine if there are any more reuse unit tables to examine. If there are more reuse unit tables, method 100 advances in step 110 to the next reuse unit table (associated with a different satellite) and returns to step 106. Otherwise, if there are no more reuse unit tables, method 100 determines in step 112 whether there are any more time intervals to examine. If there are more time intervals to examine, method 100 advances in step 114 to the next time interval and returns to step 104 to start with the first reuse unit table for the new time interval. If there are no more time intervals to examine, meaning the satellites would start to repeat their orbits again, method 100 ends in step 116. As can be seen in FIG. 2, method 100 examines every reuse unit in every reuse unit table for all time intervals (for a complete orbit around the earth).

Returning to step 106, if method 100 determines that there is at least one reuse unit assigned to a beam during the first time interval, method 100 starts in step 118 with the first reference reuse unit and computes in step 120 the interference potential between itself and the each of the other reuse units being used by adjacent satellites. The reuse unit tables associated with the adjacent satellites stores those reuse units which are being used by the adjacent satellites. By knowing which reuse units are being used and which beam the reuse unit is assigned to, method 100 can compute the interference potential between the reference reuse unit and each of the other reuse units of the adjacent satellites.

In the preferred embodiment, the interference potential is the combination of the physical distance between the center of a beam with a reuse unit on one satellite and the center of a beam with a reuse unit on another satellite and a correlation factor the measures the potential for the two reuse unit to slide in time and frequency so that they interfere with one another. For example, a reuse unit has a correlation of one with itself, but it might only have a correlation of 0.25 with the reuse units that border it in frequency and a correlation of 0.5 with the reuse unit that follows it in time. The distance between beam centers is determined by finding a linear distance between a center of a beam of a first satellite and a center of any beam of any adjacent satellite. This can be represented as $((x1-x2)^2+(y1-y2)^2+(z1-z2)^2)^{1/2}$, where $x1,y1,z1$ represents a three-dimensional location on the surface of the earth of the center of the reference beam of a first satellite (e.g., 20 in FIG. 1), and $x2,y2,z2$ represents a three-dimensional location on the surface of the earth of the center of the beam of a second satellite, (e.g., 22 in FIG. 1). In alternative embodiments, the distance is measured between the center of the beams along the surface of the earth.

Once the interference potentials are computed in step 120, method 100 determines in step 122 whether any of the computed interference potentials are less than a predetermined threshold distance and correlation. The predetermined threshold distance in the preferred embodiment is 1200 km when the correlation is 1 and gets smaller exponentially as the correlation decreases until at a correlation of zero a distance of zero is acceptable. In alternative embodiments, the predetermined threshold is equal to the minimum interference potential at which the two reuse units will not interfere. If all of the interference potentials are greater than the threshold interference potential, method 100 determines in step 124 if there are any more reuse units in the current reuse unit table being examined. If there are more reuse units, method 100 advances in step 126 to the next reuse unit and returns to step 120 to compute the interference potentials for the next reuse unit. If there are no more reuse units in the current reuse unit table, method 100 goes to step 108 to determine if there are any more reuse unit tables to examine, and so on as described above.

If any of the interference potentials computed in step 122 is less than the predetermined threshold, method 100 assigns in step 128 a reuse unit that is non-interfering. In alternative embodiments, step 122 comprises checking if all reuse units are being used, and if so, determining which reuse unit to switch with (by determining which reuse unit will be non-interfering). In another alternative embodiment, if all the reuse units (in the current reuse unit table) are not being used, method 100 determines if the current reuse unit does not interfere with adjacent reuse units. Non-interfering reuse units could interfere in time (time slide) and/or frequency.

Once method 100 has finished execution, the base station will have created new reuse unit tables for each of the satellites that are transmitted to the corresponding satellite, so that when a specific time interval occurs, the designated reuse unit will be assigned to the designated beam for the specific time interval.

It will be appreciated by those skilled in the art that the present invention examines each reuse unit of each reuse unit table for each time interval to plan reuse maintenance so there is no interference among reuse units. Yet another advantage of the present invention is to establish and maintain physical separation between reuse units as the geometry of the satellites change.

Accordingly, it is intended by the appended claims to cover all modifications of the invention which fall within the true spirit and scope of the invention.

What is claimed is:

1. A method of reuse channel management, the method comprising the steps of:
    (a) computing interference potentials between a reference reuse unit being used by a first satellite and reuse units being used by second satellites by determining each of the interference potentials based on a physical distance between a center of a first beam that uses the reference reuse unit and each of a center of second beams that use the reuse units and a correlation factor; and
    (b) assigning a non-interfering reuse unit to the first satellite when each of the interference potentials are less than a threshold interference potential.

2. A method as recited in claim 1, further comprising the step of initiating the method during a planning process.

3. A method as recited in claim 1, further comprising the step of initiating the method when one of the first and the second satellites goes down or malfunctions.

4. A method as recited in claim 1, further comprising the steps of:

using a first reuse unit table to store the reference reuse unit; and using second reuse unit tables, each storing reuse units being used by one of the second satellites.

5. A method as recited in claim 1, wherein the reference reuse unit and each of the reuse units includes eight contiguous communication channels.

6. A method as recited in claim 1, wherein the reference reuse unit and each of the reuse units has a particular time slot and frequency.

7. A method as recited in claim 1, wherein the reference reuse unit and each of the reuse units has a combination of a time slot, frequency or code.

8. A method as recited in claim 1, further comprising the step of:

(c) repeating steps (a) and (b) for each reference reuse unit being used by the first satellite.

9. A method as recited in claim 8, further comprising the step of:

(d) repeating steps (a), (b), and (c) for each time interval.

10. A method as recited in claim 1, further comprising the step of:

(c) repeating steps (a) and (b) for each reuse unit of each of the second satellites.

11. A method as recited in claim 10, further comprising the step of:

(d) repeating steps (a), (b), and (c) for each time interval.

12. A method as recited in claim 1, further comprising the steps of:

(c) repeating steps (a) and (b) for each reference reuse unit being used by the first satellite and for each reuse unit of each of the second satellites; and (d) repeating steps (a), (b), and (c) for each time interval.

13. A method as recited in claim 1, wherein the determining step includes the step of measuring the physical distance as a linear distance between the centers of the first and second beams.

14. A method as recited in claim 1, wherein the determining step includes the step of measuring the physical distance along a surface of earth where the center of the first and second beams are located.

15. A method as recited in claim 1, wherein step (b) comprises the step of determining whether the interference potentials are less than a predetermined threshold distance and correlation.

16. A method as recited in claim 1, wherein step (b) comprises the step of determining whether the interference potentials of the reference reuse unit and each of the reuse units will not interfere with each other.

17. A system comprising:

a plurality of satellites; and a base station that is capable of communicating with the satellites and includes means for performing a reuse maintenance method that computes interference potentials between a reference reuse unit being used by a first satellite and reuse units being used by the other satellites, for determining each of the interference potentials based on a physical distance between a center of a first beam that uses the reference reuse unit and each of a center of second beams that uses one of the reuse units and a correlation factor and for assigning a non-interfering reuse unit to the first satellite when each of the interference potentials are less than a threshold interference potential.

18. A system as recited in claim 17, wherein the base station includes means for initiating the reuse maintenance method during a planning process.

19. A system as recited in claim 17, wherein the base station includes means for initiating the reuse maintenance method when one of the satellites goes down or malfunctions.

20. A system as recited in claim 17, wherein the base station includes means for repeating the computation and assignment for each reference reuse unit being used by each of the satellite.

21. A system as recited in claim 17, wherein the base station includes means for repeating the computation and assignment for each reference reuse unit being used by each of the satellite for each time interval.

22. A system as recited in claim 17, wherein the base station includes means for determining whether each of the interference potentials are less than a predetermined threshold distance and correlation.

23. A system as recited in claim 17, wherein the base station includes means for determining whether each of the interference potentials of the reference reuse unit and each of the reuse units will not interfere with each other.

24. A system as recited in claim 17, wherein the base station is a satellite.

25. A system as recited in claim 17, wherein the base station is located on earth.

26. A system comprising:

a plurality of satellites; and a base station that is capable of communicating with the satellites and includes means for performing a reuse maintenance method that computes interference potentials between a reference reuse unit being used by a first satellite and reuse units being used by the other satellites, for determining each of the interference potentials based on a linear distance between a center of a first beam that uses the reference reuse unit and each of a center of second beams that uses one of the reuse unit and a correlation factor and for assigning a non-interfering reuse unit to the first satellite when each of the interference potentials are less than a threshold interference potential.

27. A system comprising:

a plurality of satellites; and a base station that is capable of communicating with the satellites and includes means for performing a reuse maintenance method that computes interference potentials between a reference reuse unit being used by a first satellite and reuse units being used by the other satellites, for determining each of the interference potential based on a distance along a surface of earth between a center of a first beam that uses the reference reuse unit and each of a center of second beams that uses one of the reuse units and a correlation factor and for assigning a non-interfering reuse unit to the first satellite when each of the interference potentials are less than a threshold interference potential.

28. A method of reuse channel management comprising the steps of:

(a) computing interference potentials between a reference reuse unit being used by a first satellite and reuse units being used by second satellites by determining each of the interference potentials based on a linear distance between a center of a first beam that uses the reference reuse unit and each of a center of second beams that use the reuse units and a correlation factor; and (b) assigning a non-interfering reuse unit to the first satellite when each of the interference potentials are less than a threshold interference potential.

29. A method of reuse channel management comprising the steps of:

(a) computing interference potentials between a reference reuse unit being used by a first satellite and reuse units being used by second satellites by determining each of the interference potentials based on a distance along a surface of earth between a center of a first beam that uses the reference reuse unit and each of a center of second beams that use the reuse units and a correlation factor; and (b) assigning a non-interfering reuse unit to the first satellite when each of the interference potentials are less than a threshold interference potential.

* * * * *